(12) United States Patent
Shimazaki et al.

(10) Patent No.: US 10,584,725 B2
(45) Date of Patent: Mar. 10, 2020

(54) METHOD OF SETTING ACTUATOR AND FLUID PRESSURE CONTROL CIRCUIT

(71) Applicant: Honda Motor Co., Ltd., Tokyo (JP)

(72) Inventors: Itsuki Shimazaki, Saitama (JP); Yuichi Hidaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 15/920,464

(22) Filed: Mar. 14, 2018

(65) Prior Publication Data

US 2018/0283415 A1    Oct. 4, 2018

(30) Foreign Application Priority Data

Mar. 30, 2017    (JP) ................. 2017-068352

(51) Int. Cl.
| | | |
|---|---|---|
| *F15B 15/28* | (2006.01) | |
| *F15B 15/14* | (2006.01) | |
| *F16H 61/00* | (2006.01) | |
| *F16H 63/34* | (2006.01) | |
| *F16D 41/16* | (2006.01) | |
| *F16H 3/66* | (2006.01) | |
| *F15B 19/00* | (2006.01) | |

(52) U.S. Cl.
CPC .......... *F15B 15/2861* (2013.01); *F15B 15/14* (2013.01); *F15B 15/2807* (2013.01); *F15B 19/002* (2013.01); *F16D 41/16* (2013.01); *F16H 3/66* (2013.01); *F16H 61/0021* (2013.01); *F16H 63/3483* (2013.01); *F15B 2211/6336* (2013.01); *F15B 2211/6656* (2013.01); *F16H 2200/0069* (2013.01); *F16H 2200/2012* (2013.01); *F16H 2200/2046* (2013.01); *F16H 2200/2048* (2013.01); *F16H 2200/2066* (2013.01); *F16H 2200/2082* (2013.01)

(58) Field of Classification Search
CPC .. F15B 15/14; F15B 15/2861; F15B 15/2807; F16D 41/16
See application file for complete search history.

(56) References Cited

U.S. PATENT DOCUMENTS 6,427,576 B1 *    8/2002    Bock ............... F15B 15/2807
                                                    92/5 R

FOREIGN PATENT DOCUMENTS

| CN | 1418308 | 5/2003 |
|---|---|---|
| CN | 1432112 | 7/2003 |

(Continued)

OTHER PUBLICATIONS

"Office Action of China Counterpart Application," with English translation thereof, dated Aug. 29, 2019, p. 1-p. 17.

*Primary Examiner* — Michael Leslie
*Assistant Examiner* — Daniel S Collins
(74) *Attorney, Agent, or Firm* — JCIPRNET

(57) ABSTRACT

A method of setting an actuator capable of accurately detecting a position of a piston using a plurality of sensor units is provided. The method includes a detection value acquisition step of moving a piston in a direction of an axis inside a cylinder and acquiring a detection value from each of a first sensor unit and a second sensor unit for each position of the piston, and a controlling sensor unit-setting step of setting a controlling sensor unit that is used for control of a two-way piston from among the first sensor unit and the second sensor unit on the basis of the detection values obtained for the first sensor unit and the second sensor unit.

19 Claims, 11 Drawing Sheets

(56) References Cited

FOREIGN PATENT DOCUMENTS

| | | |
|---|---|---|
| CN | 101344168 | 1/2009 |
| CN | 101561241 | 10/2009 |
| CN | 101632146 | 1/2010 |
| CN | 101852230 | 10/2010 |
| CN | 101918722 | 12/2010 |
| CN | 102472641 | 5/2012 |
| CN | 104458245 | 3/2015 |
| CN | 105008773 | 10/2015 |
| CN | 204921962 | 12/2015 |
| CN | 106321819 | 1/2017 |
| EP | 2400187 | 12/2011 |
| JP | 2016176589 | 10/2016 |

\* cited by examiner

| | C1 | C2 | C3 | B1 | B2 | B3 | F1 | gear ratio | common ratio |
|---|---|---|---|---|---|---|---|---|---|
| Rvs | | | O | | O | | L | 4.008 | |
| 1st | | | | O | (O) | | R/L | 5.233 | |
| | | | | | | | | | 1.554 |
| 2nd | | O | | O | O | | R | 3.367 | |
| | | | | | | | | | 1.465 |
| 3rd | | | O | O | O | | R | 2.298 | |
| | | | | | | | | | 1.348 |
| 4th | | O | O | O | | | R | 1.705 | |
| | | | | | | | | | 1.251 |
| 5th | O | (O) | O | | | | R | 1.363 | |
| | | | | | | | | | 1.363 |
| 6th | O | O | O | | | | R | 1.000 | |
| | | | | | | | | | 1.273 |
| 7th | O | | O | | O | | R | 0.786 | |
| | | | | | | | | | 1.196 |
| 8th | O | O | | | O | | R | 0.657 | |
| | | | | | | | | | 1.126 |
| 9th | O | | | | O | O | R | 0.584 | |
| | | | | | | | | | 1.120 |
| 10th | O | O | | | | O | R | 0.520 | |

METHOD OF SETTING ACTUATOR AND FLUID PRESSURE CONTROL CIRCUIT

CROSS-REFERENCE TO RELATED APPLICATION

This application claims the priority benefit of Japan application serial no. 2017-068352, filed on Mar. 30, 2017. The entirety of the above-mentioned patent application is hereby incorporated by reference herein and made a part of this specification.

BACKGROUND

Technical Field

The disclosure relates to a method of setting an actuator that controls a position of a piston on the basis of a result of detection by a stroke sensor, and a fluid pressure control circuit.

Description of Related Art

In the related art, as a hydraulic pressure control circuit (a fluid pressure control circuit) of a transmission that is mounted on a vehicle, a hydraulic pressure control circuit that controls a parking lock mechanism or the like by switching a supply destination of hydraulic pressure (fluid pressure) on the basis of a signal from a control unit is known (for example, see Patent Document 1: Japanese Unexamined Patent Application Publication No. 2016-176589).

In the hydraulic pressure control circuit described in Patent Document 1, switching of a state of the parking lock mechanism is performed via an actuator provided as a part of a hydraulic pressure control circuit. An actuator to be used in this way includes an actuator including a cylinder, a piston that moves in an axial direction inside the cylinder according to a supplied hydraulic pressure, and a stroke sensor that detects a position of the piston.

The stroke sensor includes a stroke sensor that detects a position of a piston by a magnet as a member to be detected being attached to the piston to be moved integrally with the piston and detecting a change in a magnetic force of the magnet using a sensor unit.

SUMMARY

Meanwhile, a sensor that is used for an actuator as described in Patent Document 1 includes a sensor including a plurality of sensor units in order to improve accuracy of detection. However, the detection accuracy in the sensor unit may be different for each sensor unit according to a machining accuracy of a case for fixing the sensor unit, an arrangement position of the sensor unit, or the like. Therefore, a sufficient improvement in detection accuracy may not be achieved by a simple increase in the number of sensor units.

Further, when an attachment position of a sensor unit is strictly set in order to obtain sufficient detection accuracy using a plurality of sensor units, a manufacturing process becomes complicated.

The embodiments of the invention provide a method of setting an actuator and a fluid pressure control circuit capable of accurately detecting a position of a piston using a plurality of sensor units.

An embodiment of the invention provides a method of setting an actuator (for example, a two-way piston 50 in an embodiment; the same applies hereinafter) including a stroke sensor (for example, a stroke sensor 53 in the embodiment; the same applies hereinafter), the stroke sensor including a member to be detected (for example, a member to be detected 53b in an embodiment; the same applies hereinafter) attached to move integrally with a piston (for example, a piston 52 in an embodiment; the same applies hereinafter) that moves according to a fluid pressure supplied inside a cylinder (for example, a cylinder 51 in the embodiment; the same applies hereinafter), and a sensor (for example, a sensor 53c in an embodiment; the same applies hereinafter) that detects a position of the member to be detected, and controlling a position of the piston on the basis of a result of detection by the stroke sensor, the method including: a detection value acquisition step of moving the piston in an axial direction inside the cylinder and acquiring a detection value that is a result of detecting the position of the member to be detected from each of a plurality of sensor units (for example, a first sensor unit 53c1 and a second sensor unit 53c2 in the embodiment; the same applies hereinafter) of the sensor for each position of the piston; and a control sensor unit-setting step of setting a controlling sensor unit that is used for control of the actuator from among the plurality of sensor units on the basis of the detection value obtained for each of the plurality of sensor units.

Thus, in the method of setting an actuator of one or some exemplary embodiments of the invention, the controlling sensor unit is set from among the plurality of sensor units for each position of the piston, and the control of the actuator is performed by referring to the detection value from the controlling sensor unit. Further, the controlling sensor unit is set on the basis of the detection value detected when the piston is actually moved.

That is, in this setting method, an appropriate sensor unit is set from among the plurality of sensor units according to characteristics obtained when the piston is actually moved (that is, characteristics of an individual sensor unit). Accordingly, it possible to secure sufficient detection accuracy without strictly setting an attachment position of the sensor unit in a step of attaching the sensor unit.

Further, in the method of setting an actuator of one or some exemplary embodiments of the invention, the controlling sensor unit-setting step includes setting only one sensor unit selected from the plurality of sensor units as the controlling sensor unit on the basis of the detection value obtained for each of the plurality of sensor units.

Thus, in an embodiment, when only one sensor unit is set as the controlling sensor unit, it is possible not to switch the sensor unit that acquires the detection value for each position of the piston in the control of the actuator, and therefore, the control can be easily performed.

Further, in the method of setting an actuator of one or some exemplary embodiments of the invention, the controlling sensor unit-setting step includes setting a sensor unit of which a variation in the detection value in a range in which the piston moves when the actuator is actually used is smallest among the plurality of sensor units, as the controlling sensor unit when only one sensor unit is set as the controlling sensor unit.

In the sensor unit that is used for the detection, a variation in the detection value (a difference between a maximum value and a minimum value of the detection value) may change depending on machining accuracy of components, or the like. Therefore, it is easy to further secure sufficient detection accuracy when a small variation of the detection value is used as a reference for selecting the controlling sensor unit.

Further, in the method of setting an actuator of one or some exemplary embodiments of the invention, the controlling sensor unit-setting step includes setting a sensor unit of which detection accuracy at a position or in a range of the piston having a high degree of importance in control of the actuator is highest among the plurality of sensor units, as the controlling sensor unit when only one sensor unit is set as the controlling sensor unit.

In the control of the actuator, a range in which the degree of importance is high (the position of the piston) is different depending on a device to which the actuator is applied. Therefore, when the controlling sensor unit is selected on the basis of a position at which the degree of importance is high, it is possible to efficiently achieve improvement of the control accuracy.

Further, in the method of setting an actuator of one or some exemplary embodiments of the invention, the controlling sensor unit-setting step includes setting any one sensor unit selected from the plurality of sensor units as the controlling sensor unit for each position of the piston on the basis of the detection values obtained for each of the plurality of sensor units.

Thus, when the controlling sensor unit is switched for each position of the piston, it is possible to perform the detection using a range in which the detection accuracy of each sensor unit is high, and therefore, it is easy to further secure sufficient detection accuracy.

Further, in the method of setting an actuator of one or some exemplary embodiments of the invention, the controlling sensor unit-setting step includes setting a sensor unit having the smallest variation in the detection value for each position of the piston among the plurality of sensor units, as the controlling sensor unit, when the controlling sensor unit is set for each position of the piston.

In the sensor unit that is used for the detection, a variation in the detection value (a difference between a maximum value and a minimum value of the detection value) may change depending on machining accuracy of components, or the like. Therefore, it is easy to further secure sufficient detection accuracy when a small variation of the detection value is used as a reference for selecting the controlling sensor unit.

Further, in the method of setting an actuator of one or some exemplary embodiments of the invention, the actuator may be a two-way piston that switches between a reverse rotation prevention state and a locked state of a two-way clutch.

Further, in the method of setting an actuator of one or some exemplary embodiments of the invention, the actuator may be a parking piston that switches between a parking locked state and a parking released state of a parking lock mechanism.

Further, an embodiment of the invention provides a fluid pressure control circuit including a control unit (for example, a control unit ECU in an embodiment; the same applies hereinafter) and an actuator that is controlled by the control unit, wherein the actuator includes a cylinder, a piston that moves in an axial direction inside the cylinder according to a supplied fluid pressure, and a stroke sensor that detects a position of the piston, the stroke sensor includes a member to be detected attached to move integrally with the piston, and a sensor that detects a position of the member to be detected, the sensor includes a plurality of sensor units that transmit a result of detecting the position of the member to be detected as a detection value to the control unit, the control unit includes a storage unit that stores a controlling sensor unit selected from among the plurality of sensor units, and a fluid pressure control unit that controls a fluid pressure to be supplied to the actuator by referring to the detection value from the controlling sensor unit, and the controlling sensor unit is selected on the basis of the detection value detected when the piston is actually moved.

BRIEF DESCRIPTION OF THE DRAWINGS

FIG. 9A illustrates a case in which the two-way clutch is set to a locked state, and FIG. 9B illustrates a case in which the two-way clutch is set to a reverse rotation prevention mode.

DESCRIPTION OF THE EMBODIMENTS

Hereinafter, a vehicle having a power transmission device including a lubricating structure mounted thereon according to embodiments will be described with reference to the figures.

Figure 1:
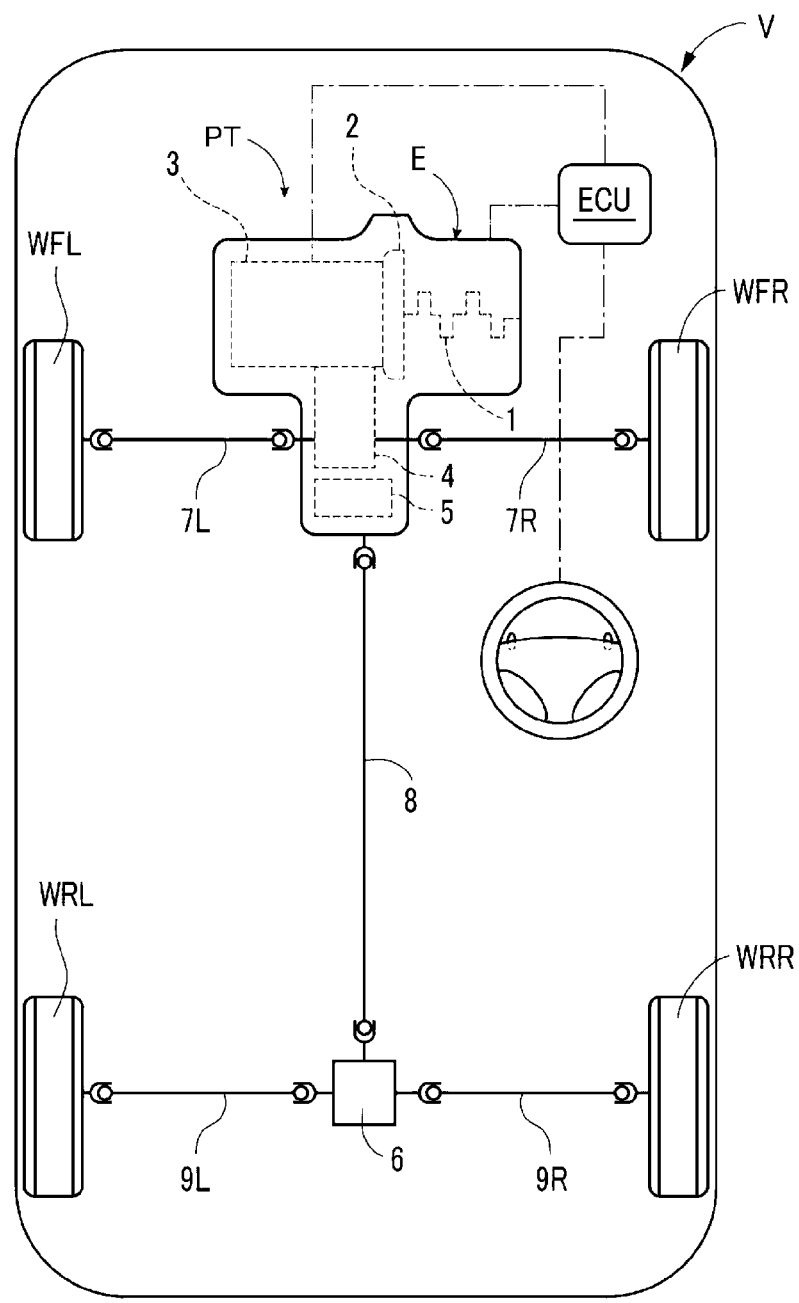
FIG. 1 is an illustrated diagram schematically illustrating a vehicle on which a transmission including an actuator according to an embodiment is mounted.

As illustrated in FIG. 1, an engine E (an internal combustion engine or a driving source) is mounted transversely on the vehicle body so that a crankshaft 1 is directed in a lateral direction of a vehicle body of a vehicle V. A driving force of the engine E is transmitted to a left front wheel WFL, a right front wheel WFR, a left rear wheel WRL, and a right rear wheel WRR via a power transmission device PT.

The power transmission device PT includes a torque converter 2 connected to the crankshaft 1, a transmission 3 connected to the torque converter 2, a front differential gear 4 connected to the transmission 3, a transfer device 5 connected to the front differential gear 4, and a rear differential gear 6 connected to the transfer device 5.

The front differential gear 4 is connected to the left front wheel WFL and the right front wheel WFR via a front left axle 7L and a front right axle 7R. The rear differential gear 6 is connected to the transfer device 5 via a propeller shaft 8, and is connected to the left rear wheel WRL and the right rear wheel WRR via a rear left axle 9L and a rear right axle 9R.

Figure 2:
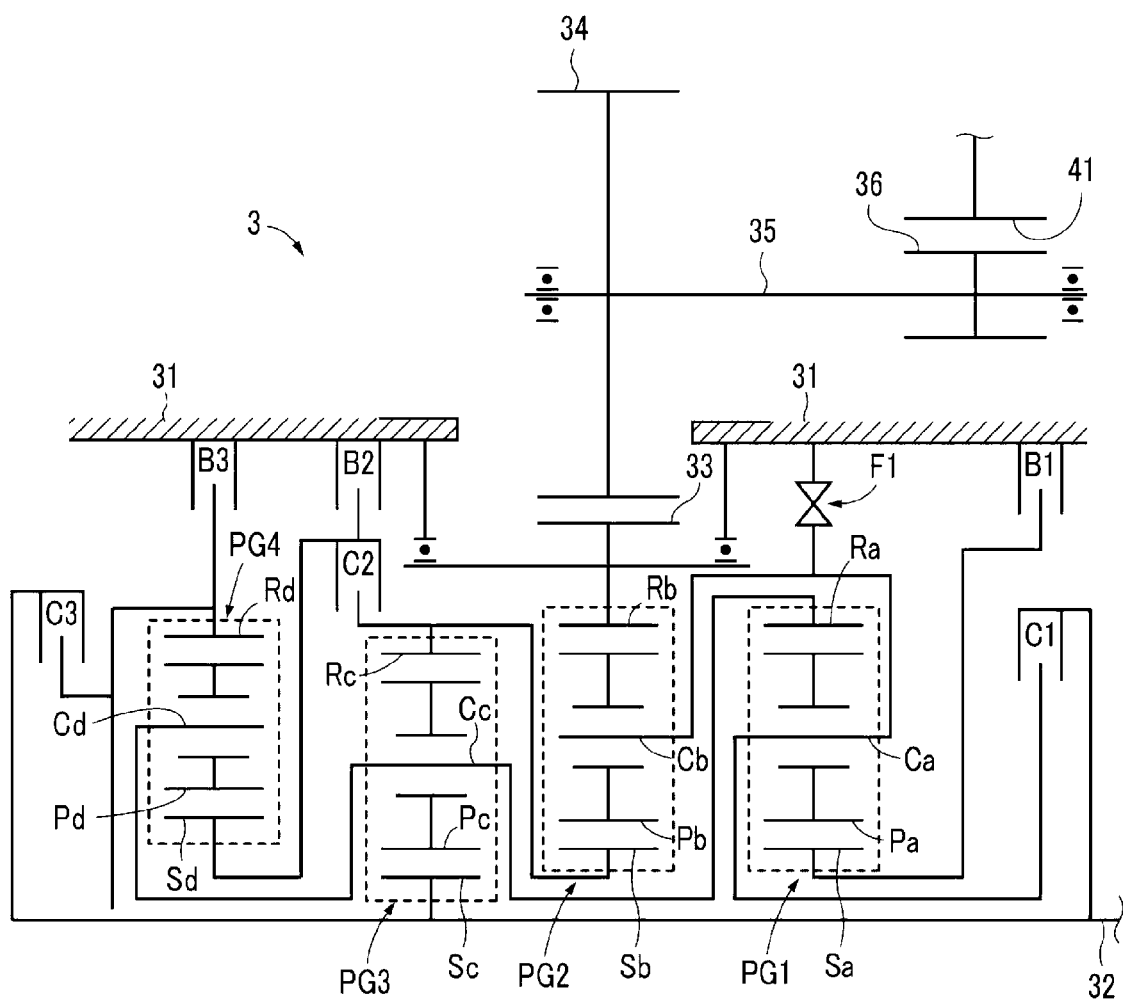
FIG. 2 is a skeleton diagram illustrating a transmission mounted on the vehicle of FIG. 1.

As illustrated in a skeleton diagram of FIG. 2, the transmission 3 includes an input shaft 32 rotatably journaled inside a transmission case 31 (casing), and an output member 33 including an output shaft arranged concentrically with the input shaft 32.

A driving force output from the engine E is transmitted to the input shaft 32 via the torque converter 2 having a lock-up clutch and a damper.

Rotation of the output member 33 is transmitted to the left front wheel WFL and the right front wheel WFR (see FIG. 1) via an idle gear 34 that engages with the output member 33, an idle shaft 35 that journals the idle gear 34, a final drive gear 36 journaled on the idle shaft 35, and a final driven wheel 41 (that is, the front differential gear 4) that engages with the final drive gear 36.

In the power transmission device PT, a single plate type or multiple plate type of starting clutch configured to be frictionally engageable may be provided instead of the torque converter 2.

Inside the transmission case 31, a first planetary gear mechanism PG1, a second planetary gear mechanism PG2, a third planetary gear mechanism PG3, and a fourth planetary gear mechanism PG4 are arranged concentrically with the input shaft 32 in this order from the engine E side.

The third planetary gear mechanism PG3 is configured as a so-called single pinion type planetary gear mechanism including, as elements, a sun gear Sc, a ring gear Rc, and a carrier Cc that rotatably and revolvably journals a pinion Pc that engages with the sun gear Sc and the ring gear Rc.

The so-called single pinion type planetary gear mechanism is also called a minus planetary gear mechanism or a negative planetary gear mechanism because the ring gear rotates in a direction different from that of the sun gear when the carrier is fixed and the sun gear is rotated. In the so-called single pinion type planetary gear mechanism, when the ring gear is fixed and the sun gear is rotated, the carrier rotates in the same direction as the sun gear.

Figure 3:
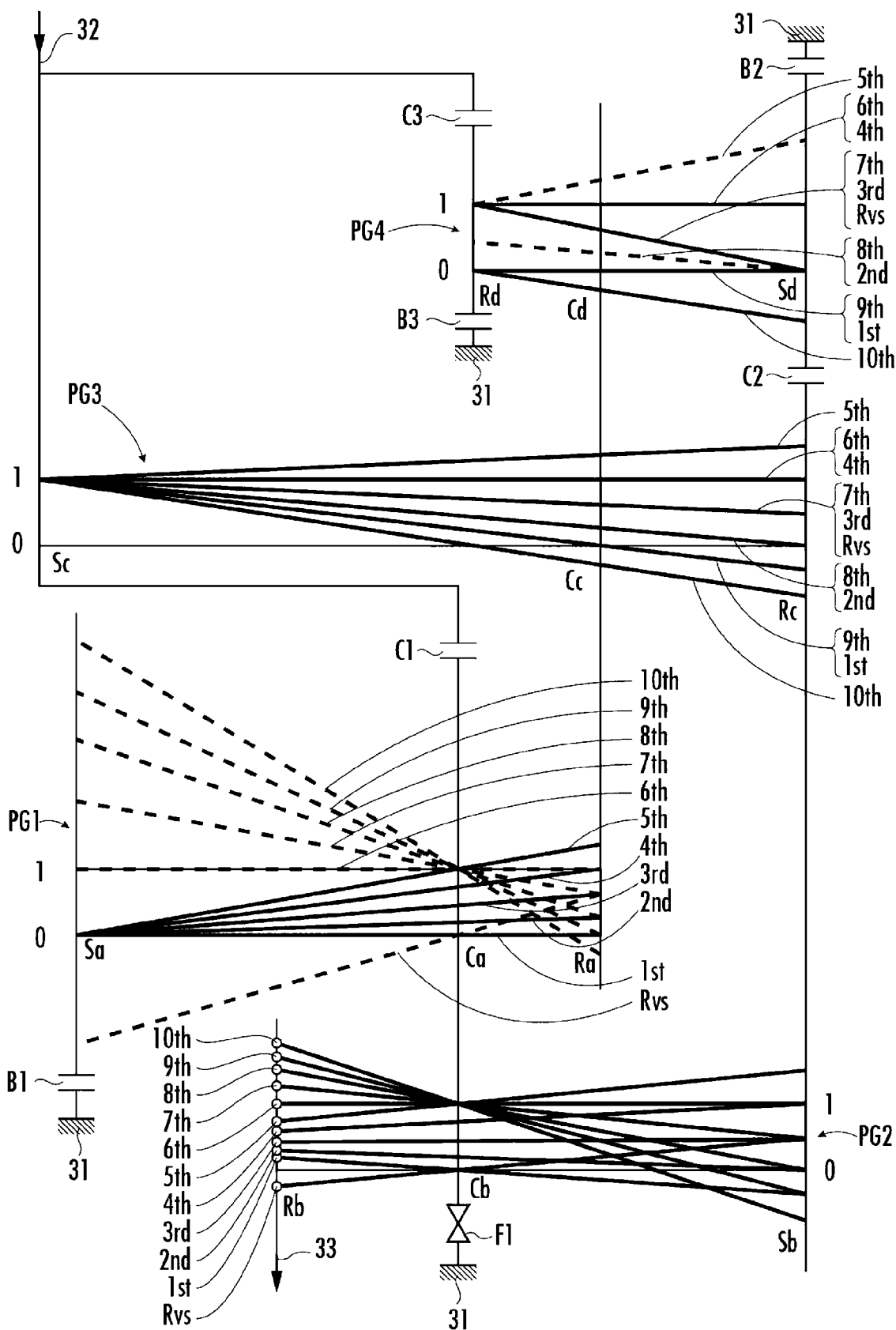
FIG. 3 is an alignment chart of a planetary gear mechanism of the transmission in FIG. 2.

An alignment chart (a diagram capable of representing ratios between relative rotational speeds of three elements including the sun gear, the carrier, and the ring gear using straight lines (speed lines)) illustrated in a second part from the top in FIG. 3 is an alignment chart of the third planetary gear mechanism PG3. As illustrated in this alignment chart, when the sun gear Sc, the carrier Cc, and the ring gear Rc that are three elements of the third planetary gear mechanism PG3 are a 1st element, a 2nd element, and a 3rd element from the left in an arrangement order at intervals corresponding to the gear ratio (number of teeth of the ring gear/number of teeth of the sun gears) in the alignment chart, respectively, the 1st element is the sun gear Sc, the 2nd element is the carrier Cc, and the 3rd element is the ring gear Rc.

Here, a ratio between an interval from the sun gear Sc to the carrier Cc and an interval from the carrier Cc to the ring gear Rc is set to h:1 when a gear ratio of the third planetary gear mechanism PG3 is h. In the alignment chart, a lower horizontal line and an upper horizontal line (lines overlapping 4th and 6th) indicate that rotational speeds are "0" and "1" (the same rotational speed as the input shaft 32), respectively.

The fourth planetary gear mechanism PG4 is also configured as a so-called single pinion type planetary gear mechanism including, as elements, a sun gear Sd, a ring gear Rd, and a carrier Cd that rotatably and revolvably journals the pinion Pd that engages with the sun gear Sd and the ring gear Rd.

An alignment chart illustrated at a first row (a top row) from the top in FIG. 3 is an alignment chart of the fourth planetary gear mechanism PG4. As illustrated in this alignment chart, when the sun gear Sd, the carrier Cd, and the ring gear Rd that are three elements of the fourth planetary gear mechanism PG4 are a 4th element, a 5th element, and a 6th element from the left in an arrangement order at intervals corresponding to the gear ratio in the alignment chart, respectively, the 4th element is the ring gear Rd, the 5th element is the carrier Cd, and the 6th element is the sun gear Sd.

Here, a ratio between an interval from the sun gear Sd to the carrier Cd and an interval from the carrier Cd to the ring gear Rd is set to i:1 when a gear ratio of the fourth planetary gear mechanism PG4 is i.

The first planetary gear mechanism PG1 is also configured as a so-called single pinion type planetary gear mechanism having, as elements, a sun gear Sa, a ring gear Ra, and a carrier Ca that rotatably and revolvably journals the pinion Pa meshed with the sun gear Sa and the ring gear Ra.

An alignment chart illustrated at a third row from the top in FIG. 3 is an alignment chart of the first planetary gear mechanism PG1. As illustrated in this alignment chart, when the sun gear Sa, the carrier Ca, and the ring gear Ra that are three elements of the first planetary gear mechanism PG1 are a 7th element, an 8th element, and a 9th element from the left in an arrangement order at intervals corresponding to the gear ratio in the alignment chart, respectively, the seventh element is the sun gear Sa, the eighth element is the carrier Ca, and the ninth element is the ring gear Ra.

Here, a ratio between an interval from the sun gear Sa to the carrier Ca and an interval from the carrier Ca to the ring gear Ra is set to j:1 in which a gear ratio of the first planetary gear mechanism PG1 is j.

The second planetary gear mechanism PG2 is also a so-called single pinion type planetary gear mechanism that includes, as elements, a sun gear Sb, a ring gear Rb, and a carrier Cb that rotatably and revolvably journals a pinion Pb meshing with the sun gear Sb and the ring gear Rb.

An alignment chart illustrated at a fourth row (a bottom row) from the top in FIG. 3 is an alignment chart of the second planetary gear mechanism PG2. As illustrated in this alignment chart, when the sun gear Sb, the carrier Cb, and the ring gear Rb that are three elements of the second planetary gear mechanism PG2 are a 10th element, an 11th element, and a 12th element from the left in an arrangement order at intervals corresponding to the gear ratio in the alignment chart, respectively, the 10th element is the ring gear Rb, the 11th element is the carrier Cb, and the 12th element is the sun gear Sb.

Here, a ratio between an interval from the sun gear Sb to the carrier Cb and an interval from the carrier Cb to the ring gear Rb is set to k:1 in which a gear ratio of the second planetary gear mechanism PG2 is k.

The sun gear Sc (a first element) of the third planetary gear mechanism PG3 is connected to the input shaft 321. Further, the ring gear Rb (a tenth element) of the second planetary gear mechanism PG2 is connected to the output member 33 that includes an output gear.

Further, the carrier Cc (a second element) of the third planetary gear mechanism PG3, the carrier Cd (a fifth element) of the fourth planetary gear mechanism PG4, and the ring gear Ra (a ninth element) of the first planetary gear mechanism PG1 are connected to one another to constitute a first connection body Cc-Cd-Ra.

Further, the ring gear Rc (a third element) of the third planetary gear mechanism PG3 and the sun gear Sb (a twelfth element) of the second planetary gear mechanism PG2 are connected to constitute the second connection body Rc-Sb.

Further, the carrier Ca (the eighth element) of the first planetary gear mechanism PG1 and the carrier Cb (the eleventh element) of the second planetary gear mechanism. PG2 are connected to each other to constitute a third connection body Ca-Cb.

Further, the transmission 3 includes seven engagement mechanisms that include three clutches including a first clutch C1, a second clutch C2, and a third clutch C3, three brakes including a first brake B1, a second brake B2, and a third brake B3, and a one two-way clutch F1.

The first clutch C1 is a hydraulically actuated wet multi-plate clutch. Using the first clutch C1, the third planetary gear mechanism PG3 is configured to be switchable between a connection state in which the sun gear Sc (the first element) is connected to the third connection body Ca-Cb and an open state in which this connection is released.

The third clutch C3 is a hydraulically actuated wet multi-plate clutch. Using the third clutch C3, the third planetary gear mechanism PG3 is configured to be switchable between a connection state in which the sun gear Sc (the first element) is connected to the ring gear Rd (the fourth element) of the fourth planetary gear mechanism PG4 and an open state in which this connection is released.

The second clutch C2 is a hydraulically actuated wet multi-plate clutch. Using the second clutch C2, the fourth planetary gear mechanism PG4 is configured to be switchable between a connection state in which the sun gear Sd (the sixth element) is connected to the second connection body Rc-Sb and an open state in which this connection is released.

The two-way clutch F1 also functions as the fourth brake B4. This two-way clutch F1 is configured to allow forward rotation (rotation in the same direction as a rotation direction of the input shaft 32 and the output member 33) of the third connection body Ca-Cb and to be switchable between a reverse rotation prevention state in which reverse rotation is prevented and a locked state in which the third connection body Ca-Cb is fixed to the transmission case 31.

The two-way clutch F1 is allowed to rotate and enters the open state when a force to rotate the third connection body Ca-Cb in the forward rotation direction is applied to the third connection body Ca-Cb in the reverse rotation prevention state. On the other hand, when a force to rotate the third connection body Ca-Cb in the reverse rotation direction is applied to the third connection body Ca-Cb, the two-way clutch F1 enters a locked state in which the rotation is prevented and the two-way clutch F1 is fixed to the transmission case 31.

The first brake B1 is a hydraulically actuated wet type multi-plate brake. With the first brake B1, the first planetary gear mechanism PG1 is configured to be switchable between a locked state in which the sun gear Sa (the seventh element) is fixed to the transmission case 31, and an open state in which this fixing is released.

The second brake B2 is a hydraulically actuated wet type multi-plate brake. With the second brake B2, the fourth planetary gear mechanism PG4 is configured to be switchable between a locked state in which the sun gear Sa (the sixth element) is fixed to the transmission case 31, and an open state in which this fixing is released.

The third brake B3 is a hydraulically actuated wet type multi-plate brake. With the third brake B3, the fourth planetary gear mechanism PG4 is configured to be switchable between a locked state in which the ring gear Rd (the fourth element) is fixed to the transmission case 31, and an open state in which this fixing is released.

Switching of the three clutches including the first clutch C1, the second clutch C2, and the third clutch C3, the three brakes including the first brake B1, the second brake B2, and the third brake B3, and the one two-way clutch F1 is controlled on the basis of vehicle information such as a traveling speed of the vehicle V that is transmitted from an integrated control unit (not illustrated) or the like by the control unit ECU (see FIG. 1) including a transmission control unit (TCU).

The control unit ECU is configured as an electronic unit including a CPU, a memory, and the like (not illustrated). The control unit ECU receives predetermined vehicle information such as a traveling speed of the vehicle V, an accelerator opening degree, a rotational speed or an output torque of the engine E, or information on an operation of a paddle shift lever, and executes a control program stored in a storage device such as a memory using the CPU to control the transmission 3.

In the transmission 3, the first clutch C1, the first planetary gear mechanism PG1, the second planetary gear mechanism PG2, the third planetary gear mechanism PG3, the second clutch C2, the fourth planetary gear mechanism PG4, and the third clutch C3 are arranged on an axis of the input shaft 32 in order from the engine E and the torque converter 2 side.

The third brake B3 is arranged radially outward from the fourth planetary gear mechanism PG4, the second brake B2 is arranged radially outward from the second clutch C2, the first brake B1 is arranged radially outward from the first clutch C1, and the two-way clutch F1 is arranged radially outward from the first planetary gear mechanism PG1.

Therefore, in the transmission 3, the first brake B1, the second brake B2, the third brake B3, and the two-way clutch F1 are arranged radially outward from the planetary gear mechanism or the clutch. Accordingly, an axial length of the transmission 3 is shorter as compared with a case in which the first brake B1, the second brake B2, the third brake B3, and the two-way clutch F1 are arranged side by side on the axis of the input shaft 32 together with the planetary gear mechanism.

When the third brake B3 can be arranged radially outward from the third clutch C3 and the second brake B2 can be arranged radially outward from the fourth planetary gear mechanism PG4, it is possible to similarly achieve shortening.

Here, a case in which each gear stage of the transmission 3 of the embodiment is established will be described with reference to FIGS. 3 and 4.

A speed line indicated by a broken line in FIG. 3 indicates that each of elements of other planetary gear mechanisms rotate (revolve) while following a planetary gear mechanism that transmits power among the first planetary gear mechanism PG1, the second planetary gear mechanism PG2, the third planetary gear mechanism PG3, and the fourth planetary gear mechanism PG4.

Figures 4, 5:
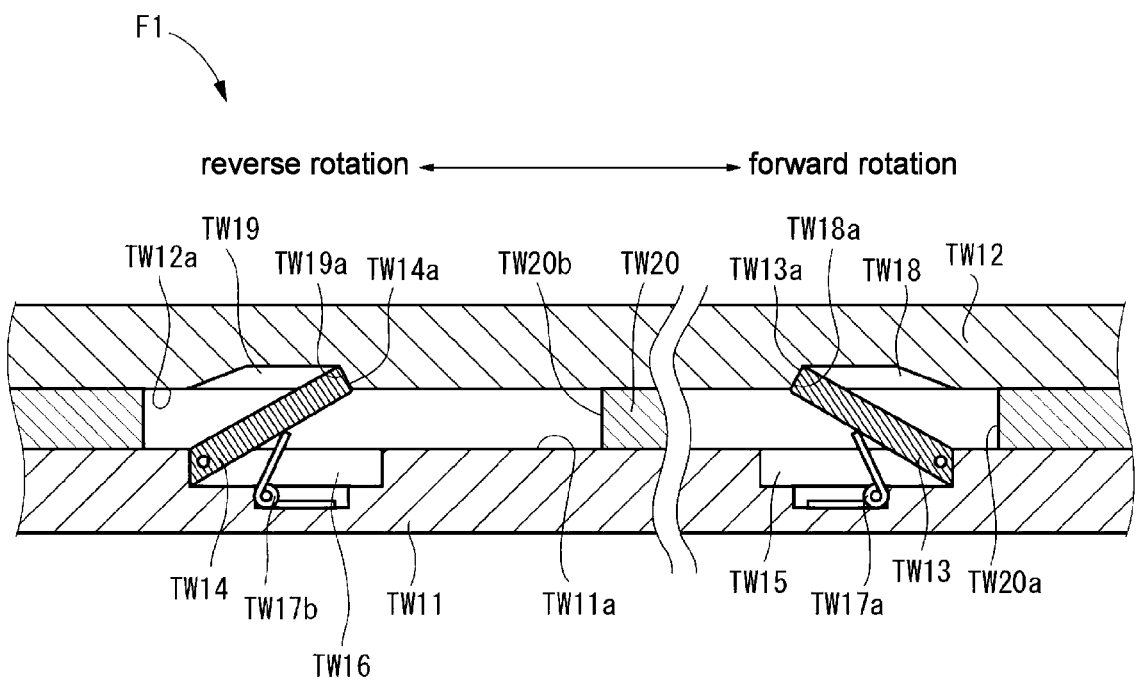
FIG. 4 is an illustrative view illustrating an engagement state of each engagement mechanism in each gear stage of the transmission in FIG. 2.
FIG. 5 is a sectional view illustrating a locked state of the two-way clutch illustrating of the transmission in FIG. 2.

FIG. 4 is a diagram is a combination of states of three clutches including the first clutch C1, the second clutch C2, and the third clutch C3, three brakes including the first brake B1, the second brake B2, and the third brake B3, and one two-way clutch F1 in each gear stage which will be described below.

In FIG. 1, "O" in columns of the first clutch C1, the second clutch C2, the third clutch C3, the first brake B1, the second brake B2, and the third brake B3 indicates the connection state or the locked state, and a blank indicates the open state. Further, "R" in the column of the two-way clutch F1 indicates a reverse rotation prevention state, and "L" indicates the locked state.

Further, underlined "R" and "L" indicate that the rotational speed of the third connection body Ca-Cb has become "0" due to action of the two-way clutch F1. Further, "R/L" indicates "R" in the reverse rotation prevention state in the normal state, but switching to "L" in the locked state when the engine brake is applied.

Further, FIG. 4 illustrates a gear ratio of each gear stage (rotational speed of the input shaft 32/rotational speed of the output member 33), and a common ratio (a ratio of gear ratios between respective gear stages. A value obtained by dividing a gear ratio of a predetermined gear stage by a gear ratio of a gear stage that is one stage higher than a predetermined gear stage) when a gear ratio h of the third planetary gear mechanism PG3 is 2.734, a gear ratio i of the fourth planetary gear mechanism PG4 is 1.614, a gear ratio j of the first planetary gear mechanism PG1 is 2.681, and a gear ratio k of the second planetary gear mechanism PG2 is 1.914. It can be seen from this that the common ratio can be set appropriately.

When the first gear stage is established, the two-way clutch F1 is set to the reverse rotation prevention state (R in FIG. 4), and the first brake B1 and the second brake B2 are set to a locked state.

By setting the two-way clutch F1 to the reverse rotation prevention state (R) and the first brake B1 to the locked state, the reverse rotation of the third connection body Ca-Cb and the sun gear Sa (the seventh element) of the first planetary gear mechanism PG1 is prevented, and the rotational speed of the third connection body Ca-Cb and the sun gear Sa (the seventh element) of the first planetary gear mechanism PG1 becomes "0".

Accordingly, the sun gear Sa (the seventh element), the carrier Ca (the eighth element), and the ring gear Ra (the ninth element) of the first planetary gear mechanism PG1 enter a locked state in which relative rotation is impossible, and the rotational speed of the first connection body Cc-Cd-Ra including the ring gear Ra (the ninth element) of the first planetary gear mechanism PG1 also becomes "0".

The rotational speed of the ring gear Rb (the tenth element) of the second planetary gear mechanism PG2 to which the output member 33 is connected becomes "1st" illustrated in FIG. 3, and the first gear stage is established.

In order to establish the first gear stage, it is possible not to set the second brake B2 to the locked state. However, the first gear stage is fixed in order to smoothly shift from the first gear stage to the second gear stage to be described below. Further, when an engine brake is applied at the first gear stage, the two-way clutch F1 may be switched from the reverse rotation prevention state (R) to the locked state (L).

When the second gear stage is established, the two-way clutch F1 is set to the reverse rotation prevention state (R), the first brake B1 and the second brake B2 are set to the locked state, and the second clutch C2 is set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0". Further, by setting the second brake B2 to the locked state, the rotational speed of the sun gear Sd (the sixth element) of the fourth planetary gear mechanism PG4 becomes "0".

Further, by setting the second clutch C2 to the connection state, the rotational speed of the second connection body Rc-Sb becomes "0", which is the same speed as the rotational speed of the sun gear Sd (the sixth element) of the fourth planetary gear mechanism PG4.

The rotational speed of the ring gear Rb (the tenth element) of the second planetary gear mechanism PG2 to which the output member 33 is connected becomes "2nd" illustrated in FIG. 3, and the second gear stage is established.

When the third gear stage is established, the two-way clutch F1 is set to the reverse rotation prevention state (R), the first brake B1 and the second brake B2 are set to the locked state, and the third clutch C3 is set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0". Further, by setting the second brake B2 to the locked state, the rotational speed of the sun gear Sd (the sixth element) of the fourth planetary gear mechanism PG4 becomes "0".

Further, by setting the third clutch C3 to the connection state, the rotational speed of the ring gear Rd (the fourth element) of the fourth planetary gear mechanism PG4 becomes "1", which is the same speed as the rotational speed of the sun gear Sc (the first element) of the third planetary gear mechanism PG3 connected to the input shaft 32.

Accordingly, since the rotational speed of the sun gear Sd (the sixth element) of the fourth planetary gear mechanism PG4 becomes "0" and the rotational speed of the ring gear Rd (the fourth element) becomes "1", the rotational speed of the carrier Cd (the fifth element), that is, the rotational speed of the first connection body Cc-Cd-Ra is $i/(i+1)$.

The rotational speed of the ring gear Rb (the tenth element) of the second planetary gear mechanism PG2 to which the output member 33 is connected becomes "3rd" illustrated in FIG. 3, and the third gear stage is established.

When the 4th gear stage is established, the two-way clutch F1 is set to the reverse rotation prevention state, the first brake B1 is set to the locked state, and the second clutch C2 and the third clutch C3 are set to a connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0".

Further, by setting the second clutch C2 to the connection state, the sun gear Sd (the sixth element) of the fourth planetary gear mechanism PG4 and the second connection body Rc-Sb rotate at the same speed. Accordingly, the carrier Cc (the second element) and the carrier Cd (the fifth element) are connected and the ring gear Rc (the third element) and the sun gear Sd (the sixth element) are connected between the third planetary gear mechanism PG3 and the fourth planetary gear mechanism PG4. Therefore, in the 4th gear stage in which the second clutch C2 is connected, one alignment chart including four elements can be drawn by the third planetary gear mechanism PG3 and the fourth planetary gear mechanism PG4.

Further, by setting the third clutch C3 to the connection state, the rotational speed of the ring gear Rd (the fourth element) of the fourth planetary gear mechanism PG4 becomes "1" that is the same as the rotational speed of the sun gear Sc (the first element) of the third planetary gear mechanism PG3, and the rotational speeds of two elements among the four elements configured by the third planetary gear mechanism PG3 and the fourth planetary gear mechanism PG4 become "1" which is the same speed.

Accordingly, the respective elements of the third planetary gear mechanism PG3 and the fourth planetary gear mechanism PG4 enter a locked state in which relative rotation is impossible, and the rotational speeds of all the elements of the third planetary gear mechanism PG3 and the fourth planetary gear mechanism PG4 become "1". Further, the rotational speed of the third connection body Ca-Cb becomes j/(j+1).

The rotational speed of the ring gear Rb (the tenth element) of the second planetary gear mechanism PG2 to which the output member 33 is connected becomes "4th" illustrated in FIG. 3, and the 4th gear stage is established.

When the 5th gear stage is established, the two-way clutch F1 is set to the reverse rotation prevention state, the first brake B1 is set to the locked state, and the first clutch C1 and the third clutch C3 are set to the connection state.

By setting the two-way clutch F1 to the reverse rotation prevention state, the forward rotation of the third connection body Ca-Cb is allowed. Further, by setting the first brake B1 to the locked state, the rotational speed of the sun gear Sa (the seventh element) of the first planetary gear mechanism PG1 becomes "0".

Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "5th" illustrated in FIG. 3, and the fifth gear stage is established.

In order to establish the 5th gear stage, it is possible not to set the third clutch C3 to the connection state. However, in the 4th gear stage and the 6th gear stage to be described below, since the third clutch C3 is set to the connection state, the connection state is set in the 5th gear stage so that downshift from the 5th gear stage to the 4th gear stage and upshift from the 5th gear stage to the 6th gear stage to be described below are smoothly performed.

When the 6th gear stage is established, the two-way clutch F1 is set to the reverse rotation prevention state, and the first clutch C1, the second clutch C2, and the third clutch C3 are set to the connection state.

By setting the two-way clutch F1 to the reverse rotation prevention state, the forward rotation of the third connection body Ca-Cb is allowed.

Further, by setting the second clutch C2 and the third clutch C3 to the connection state, the respective elements of the third planetary gear mechanism PG3 and the fourth planetary gear mechanism PG4 enter a state in which the relative rotation is impossible, and the rotational speed of the second connection body Rc-Sb becomes "1", as described in the description of the 4th gear stage. Further, by setting the first clutch C1 to the connection state, the rotational speed of the third connection body Ca-Cb becomes "1".

Accordingly, the carrier Cb (the eleventh element) and the sun gear Sb (the twelfth element) of the second planetary gear mechanism PG2 become the same speed "1", and the respective elements enter the locked state in which relative rotation is impossible.

The rotational speed of the ring gear Rb (the tenth element) of the second planetary gear mechanism PG2 to which the output member 33 is connected becomes "1" of "6th" illustrated in FIG. 3, and the 6th gear stage is established.

When the seventh gear is established, the two-way clutch F1 is set to the reverse rotation prevention state, the second brake B2 is set to the locked state, and the first clutch C1 and the third clutch C3 are set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0".

Further, by setting the third clutch C3 to the connection state, the rotational speed of the ring gear Rd (the fourth element) of the fourth planetary gear mechanism PG4 becomes "1" which is the same speed as the rotational speed of the sun gear Sc (the first element) of the third planetary gear mechanism PG3, and the rotational speed of the first connection body Cc-Cd-Ra including the carrier Cd (the fifth element) of the fourth planetary gear mechanism PG4 becomes i/(i+1). Further, by setting the first clutch C1 to the connection state, the rotational speed of the third connection body Ca-Cb becomes "1" that is the same speed as the rotational speed of the sun gear Sc (the first element) of the third planetary gear mechanism PG3 connected to the input shaft 32.

The rotational speed of the ring gear Rb (the tenth element) of the second planetary gear mechanism PG2 to which the output member 33 is connected becomes "7th" illustrated in FIG. 3, and the seventh gear stage is established.

When the 8th gear stage is established, the two-way clutch F1 is set to the reverse rotation prevention state, the second brake B2 is set to the locked state, and the first clutch C1 and the second clutch C2 are set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0".

Further, by setting the second clutch C2 to the connection state, the rotational speed of the second connection body Rc-Sb becomes "0" which is the same speed as the rotational speed of the sun gear Sd (the sixth element) of the fourth planetary gear mechanism PG4. Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "8th" illustrated in FIG. 3, and the 8th gear stage is established.

When the 9th gear stage is established, the two-way clutch F1 is set to the reverse rotation prevention state, the second brake B2 and the third brake B3 are set to the locked state, and the first clutch C1 is set to the connection state.

By setting the two-way clutch F1 to the reverse rotation prevention state, the forward rotation of the third connection body Ca-Cb is allowed. Further, by setting the second brake B2 to the locked state, the rotational speed of the sun gear Sd (the sixth element) of the fourth planetary gear mechanism PG4 becomes "0". Further, by setting the third brake B3 to the locked state, the rotational speed of the ring gear Rd (the fourth element) of the fourth planetary gear mechanism PG4 also becomes "0".

Accordingly, the sun gear Sd (the sixth element), the carrier Cd (the fifth element), and the ring gear Rd (the fourth element) of the fourth planetary gear mechanism PG4 enter the locked state in which relative rotation is impossible, and the rotational speed of the first connection body Cc-Cd-Ra including the carrier Cd (the fifth element) of the fourth planetary gear mechanism PG4 is also "0".

Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "9th" illustrated in FIG. 3, and the 9th gear stage is established.

When the 10th gear stage is established, the two-way clutch F1 is set to the reverse rotation prevention state, the third brake B3 is set to the settling state, and the first clutch C1 and the second clutch C2 are set to the connection state.

By setting the two-way clutch F1 to the reverse rotation prevention state, the forward rotation of the third connection body Ca-Cb is allowed. Further, by setting the third brake B3 to the locked state, the rotational speed of the ring gear Rd (the fourth element) of the fourth planetary gear mechanism PG4 becomes "0".

Further, by setting the second clutch C2 to the connection state, the second connected body Rc-Sb and the sun gear Sd (the sixth element) of the fourth planetary gear mechanism PG4 rotate at the same speed. Further, by setting the first clutch C1 to the connection state, the rotational speed of the third connection body Ca-Cb becomes "1" which is the same speed as the rotational speed of the sun gear Sc (the first element) of the third planetary gear mechanism PG3.

The rotational speed of the ring gear Rb (the tenth element) of the second planetary gear mechanism PG2 to which the output member 33 is connected becomes "10th" illustrated in FIG. 3, and the 10th gear stage is established.

When the reverse stage is established, the two-way clutch F1 is set to the locked state (L in FIG. 4), the second brake B2 is set to the connection state, and the third clutch C3 is set to the connection state.

By setting the second brake B2 to the locked state and setting the third clutch C3 to the connection state, the rotational speed of the first connection body Cc-Cd-Ra becomes i/(i+1). Further, by setting the two-way clutch F1 to the locked state, the rotational speed of the third connection body Ca-Cb becomes "0".

The rotational speed of the ring gear Rb (the tenth element) of the second planetary gear mechanism PG2 to which the output member 33 is connected becomes "Rvs" which is reverse rotation illustrated in FIG. 3, and the reverse stage is established.

Next, the two-way clutch F1 will be described in detail with reference to FIGS. 5 to 8.

The two-way clutch F1 is configured to be switchable between a locked state in which the third connection body Ca-Cb is fixed to the transmission case 31 and a reverse rotation preventions state in which forward rotation of the third connected body Ca-Cb is allowed and reverse rotation thereof is prevented.

Figure 6:
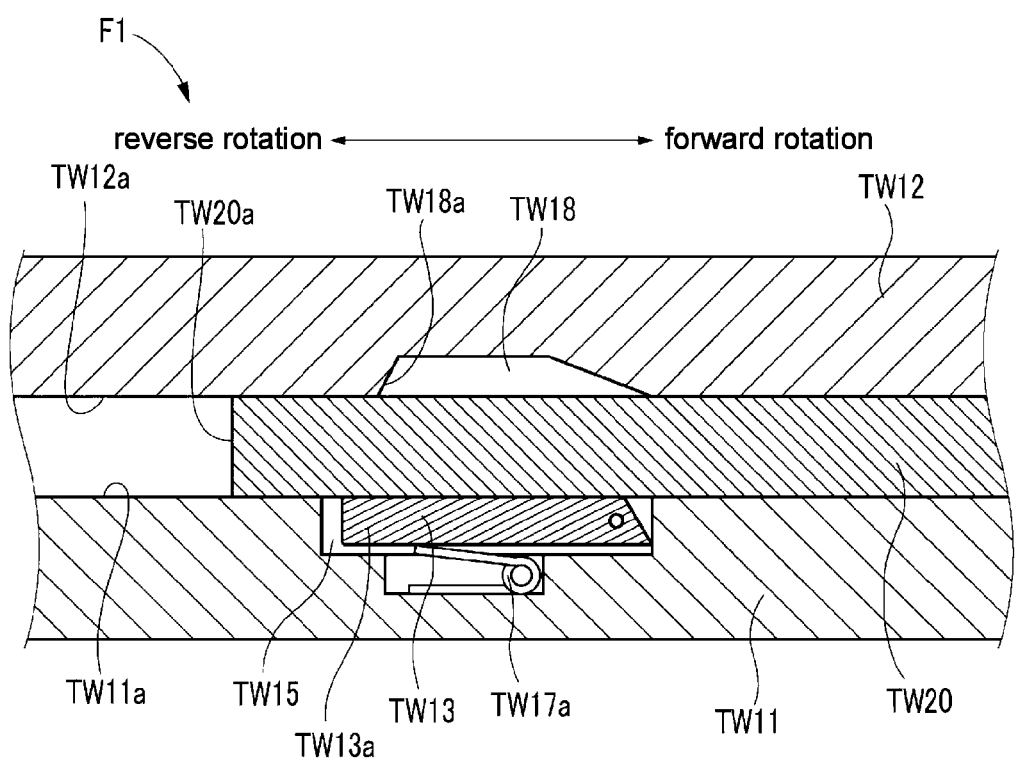
FIG. 6 is a cross-sectional view illustrating a reverse rotation prevention state of a main part of the two-way clutch of the transmission in FIG. 2.

As illustrated in cross section in FIGS. 5 and 6, the two-way clutch F1 includes a fixed plate TW11 fixed in the transmission case 31, and a rotation plate TW12.

Figure 7:
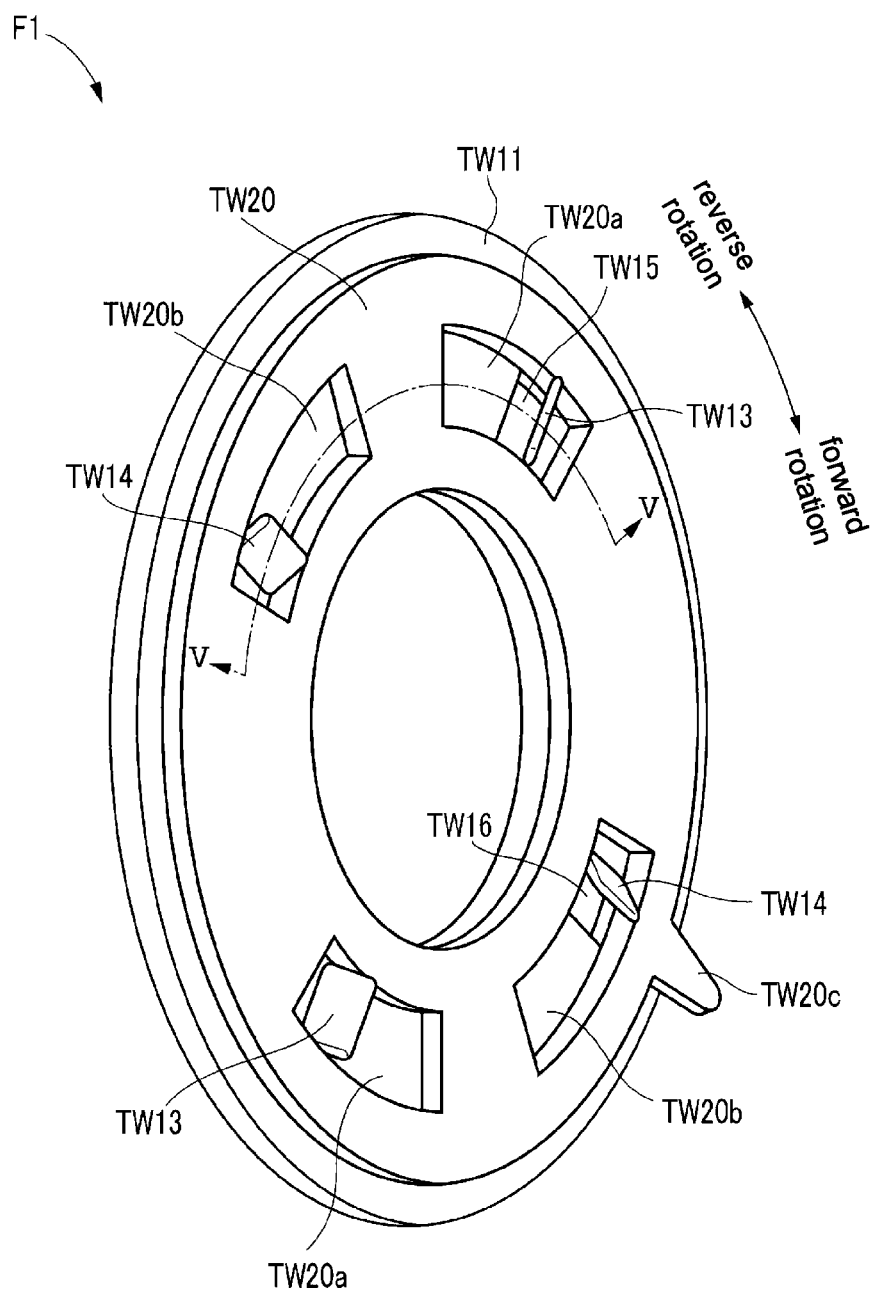
FIG. 7 is a perspective view illustrating a locked state of the two-way clutch of the transmission in FIG. 2.

As illustrated in FIG. 7, the fixed plate TW11 is formed in an annular shape (a donut shape). Although not illustrated in FIG. 7, the rotation plate TW12 is also formed in an annular shape (a donut shape) similar to the fixed plate TW11, and the fixed plate TW11 and the rotation plate TW12 are arranged concentrically.

As illustrated in FIG. 5, a plate-shaped forward rotation prevention side swing portion TW13, and a plate-like reverse rotation prevention side swing portion TW14 are provided on a first opposing surface TW11a of the fixed plate TW11 facing the rotation plate TW12.

The forward rotation prevention side swing portion TW13 is attached to the fixed plate TW11 so that a first end portion TW13a on the other circumferential side (a direction in which the rotation plate TW12 rotates in a reverse direction) can be swung using an end portion on one circumferential side of the fixed plate TW11 (a direction in which the rotation plate TW12 rotates in a forward direction) as a shaft.

The reverse rotation prevention side swing portion TW14 is attached to the fixed plate TW11 so that a second end portion TW14a on one circumferential side (a forward rotation direction) can be swung using an end portion on the other circumferential side of the fixed plate TW11 (a reverse rotation direction) as a shaft.

Further, a first reception portion TW15 recessed to be able to receive the forward rotation prevention side swing portion TW13, and a second reception portion TW16 recessed to be able to receive the reverse rotation prevention side swing portion TW14 are provided in the first opposing surface TW11a of the fixed plate TW11.

A first biasing member TW17a made of a spring that biases the forward rotation prevention side swing portion TW13 is provided on a bottom surface of the first reception portion TW15 so that the swinging first end portion TW13a of the forward rotation prevention side swing portion TW13 protrudes from the first reception portion TW15.

A second biasing member TW17b made of a spring that biases the reverse rotation prevention side swing portion TW14 is provided on a bottom surface of the second reception portion TW16 so that the swinging second end portion TW14a of the reverse rotation prevention side swing portion TW14 protrudes from the second reception portion TW16.

On a second opposing surface TW12a of the rotation plate TW12 facing the fixed plate TW11, a first hole TW18 is provided at a position corresponding to the forward rotation prevention side swing portion TW13, and a second hole TW19 is provided at a position corresponding to the reverse rotation prevention side swing portion TW14.

In the first hole TW18 provided at the position corresponding to the forward rotation prevention side swing portion TW13, a first engagement portion TW18a having a step shape that is located on the other circumferential side (reverse rotation direction side) of the rotation plate TW12 and is engageable with the swinging first end portion TW13a of the forward rotation prevention side swing portion TW13 is provided.

In the second hole TW19 provided at the position corresponding to the reverse rotation prevention side swing portion TW14, a second engagement portion TW19a having a step shape that is located on one circumferential side (forward rotation direction side) of the rotation plate TW12 and is engageable with the swinging second end portion TW14a of the reverse rotation prevention side swing portion TW14 is provided.

As illustrated in FIGS. 5 and 7, when the first end portion TW13a of the forward rotation prevention side swing portion TW13 and the first engagement portion TW18a can be engaged with each other, and the second end portion TW14a of the reverse rotation prevention side swing portion TW14 and the second engagement portion TW19a can be engaged with each other, both the forward rotation and the reverse rotation of the rotation plate TW12 is prevented. Therefore, a state in which the first end portion TW13a and the second end portion TW14a and the first engagement portion TW18a and the second engagement portion TW19a corresponding thereto are engaged with each other becomes a locked state in the two-way clutch F1.

A switching plate TW20 is sandwiched between the fixed plate TW11 and the rotation plate TW12. The switching plate TW20 is also formed in an annular shape (a donut shape). A first notch hole TW20a and a second notch hole TW20b are provided at positions corresponding to the forward rotation prevention side swing portion TW13 and the reverse rotation prevention side swing portion TW14 in the switching plate TW20. At an outer edge of the switching plate TW20, a protrusion portion TW20c protruding outward in a radial direction is provided.

Figure 8:
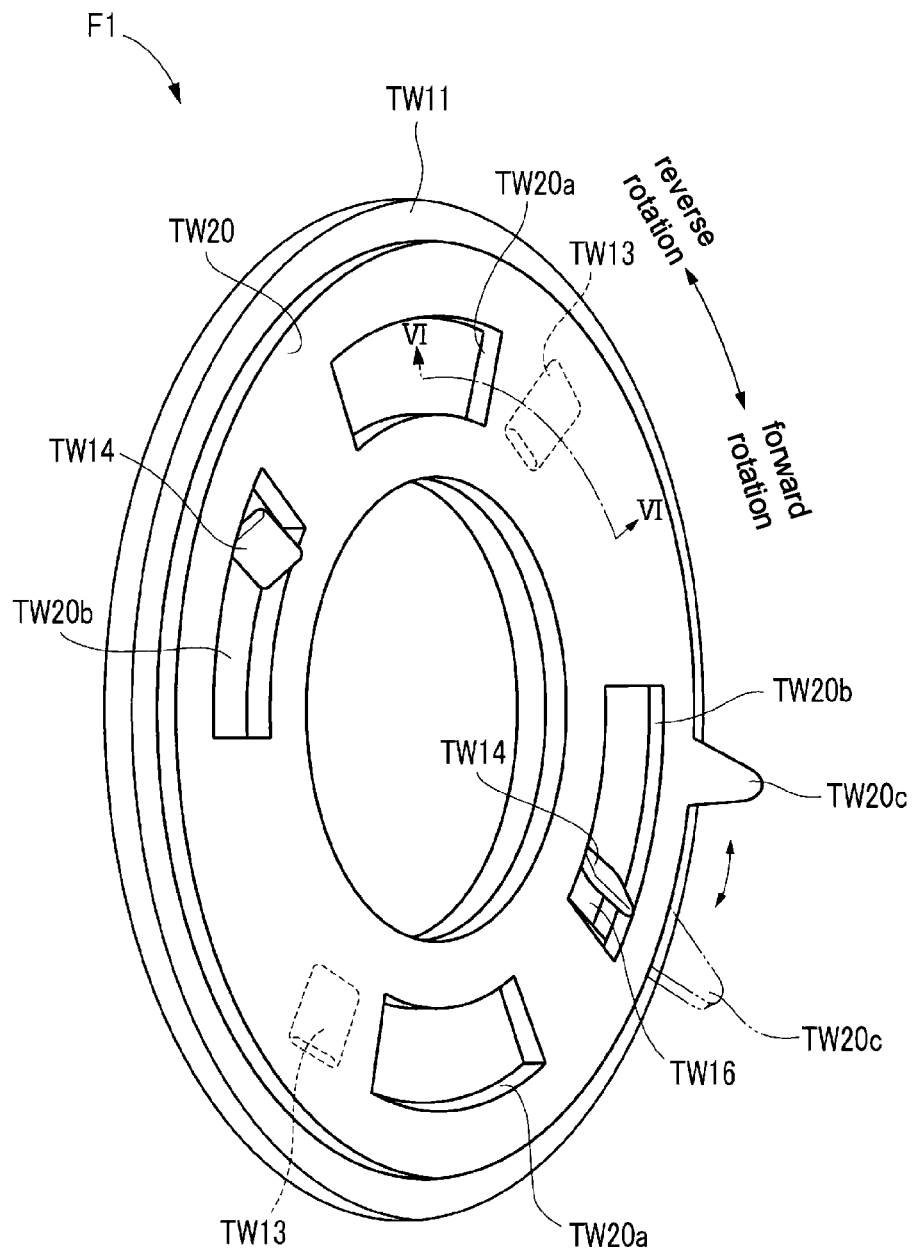
FIG. 8 is a perspective view illustrating a reverse rotation prevention state of the two-way clutch of the transmission in FIG. 2.

As illustrated in FIG. 8, the switching plate TW20 is freely rotatable with respect to the fixed plate TW11.

When the switching plate TW20 is swung from the locked state illustrated in FIG. 7 to the state illustrated in FIG. 8, the first notch hole TW20a corresponding to the forward rotation prevention side swing portion TW13 moves to exceed the forward rotation prevention side swing portion TW13, as illustrated in FIG. 6. The forward rotation prevention side swing portion TW13 is pressed against the switching plate TW20 and is accommodated in the first reception portion TW15 against the pressing force of the first biasing member TW17a.

Accordingly, engagement of the first end portion TW13a of the forward rotation prevention side swing portion TW13 with the first engagement portion TW18a is prevent, and the rotation on the forward rotation side of the rotation plate TW12 is allowed.

Further, as illustrated in FIG. 8, the second notch hole TW20b corresponding to the reverse rotation prevention side swing portion TW14 is configured such that the second end portion TW14a can be engaged with the second engagement portion TW19a without the reverse rotation prevention side swing portion TW14 accommodated in the second reception portion TW16 even when the switching plate TW20 is swung from the locked state illustrated in FIG. 7 to the state illustrated in FIG. 8.

From these facts, the states illustrated in FIGS. 6 and 8 become the reverse rotation prevention state in the two-way clutch F1.

Next, a switching control mechanism for performing switching of the two-way clutch F1 will be described with reference to FIGS. 9A and 9B.

Figure 9A:
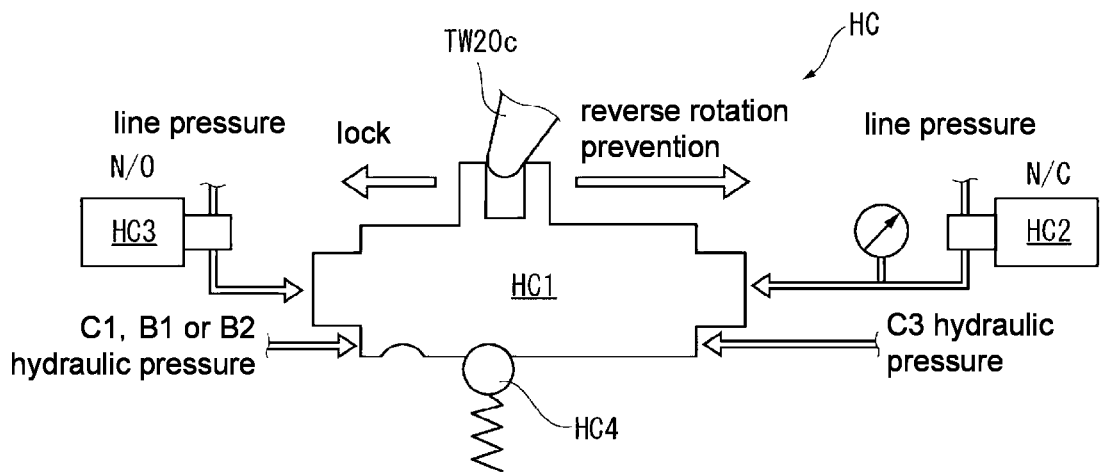
FIGS. 9A and 9B are illustrative diagrams illustrating a switching control mechanism that performs switching of a two-way clutch of a transmission in FIG. 2.
Figure 9B:
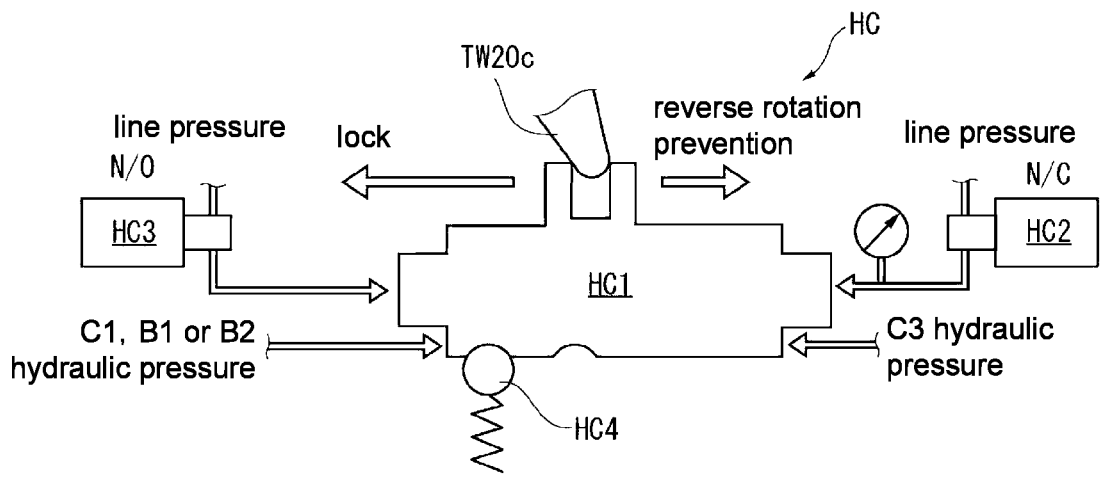

As illustrated in FIGS. 9A and 9B, a hydraulic pressure control circuit HC (fluid pressure control circuit) provided in the transmission 3 includes a piston HC1 that is engaged with the protrusion portion TW20c provided in the switching plate TW20. The two-way clutch F1 is switched to the locked state when the piston HC1 moves to a predetermined position (a position illustrated in FIG. 9A) on the left side illustrated in FIGS. 9A and 9B, and is switched to the reverse rotation prevention state when the piston HC1 moves to a predetermined position (a position illustrated in FIG. 9B) on the right side illustrated in FIGS. 9A and 9B.

On the right side of the piston HC1 in the figure, a line pressure can be freely supplied via a first opening and closing valve HC2 including a solenoid valve. On the left side of the piston HC1 in the figure, a line pressure can be freely supplied via a second opening and closing valve HC3 including a solenoid valve. The first opening and closing valve HC2 is a normally closed type, and the second opening and closing valve HC3 is a normally open type.

The first opening and closing valve HC2 and the second opening and closing valve HC3 are opened and closed according to a signal from the control unit ECU. That is, the two-way clutch F1 is controlled by the control unit ECU via the hydraulic pressure control circuit HC.

On the right side of the piston HC1 in the figure, hydraulic pressure (fluid pressure) that is located on a surface different from a surface receiving the line pressure and supplied to the third clutch C3 is supplied. On the left side of the piston HC1 in the figure, hydraulic pressure that is located on a surface different from a surface receiving the line pressure and supplied to the first clutch C1, the first brake B1, or the second brake B2 is supplied. The hydraulic pressures of the first clutch C1, the first brake B1, or the second brake B2, and the third clutch C3 supplied to the piston HC1 are used as RVS preparatory pressure.

Further, a detent mechanism HC4 is provided in the piston HC1 and is configured so that switching between the locked state illustrated in FIG. 9A and the reverse rotation prevention state illustrated in FIG. 9B does not occur unless the line pressure exceeds a predetermined value.

According to this hydraulic pressure control circuit HC, the piston HC1 moves to the left side in the figure and the two-way clutch F1 is switched to the locked state by setting the line pressure to be equal to or higher than predetermined switching hydraulic pressure that is set on the basis of a pressure difference between the hydraulic pressure of the first clutch C1, the first brake B1, or the second brake B2 and the hydraulic pressure of the third clutch C3 and a load due to the first elastic member 54a and the second elastic member 54b constituting the detent mechanism HC4 by opening the first opening and closing valve HC2 and closing the second opening and closing valve HC3.

Conversely, the piston HC1 moves to the right side in the figure and the two-way clutch F1 is switched to the reverse rotation prevention state by setting the line pressure to be equal to or higher than the predetermined switching hydraulic pressure described above by closing the first opening and closing valve HC2 and opening the second opening and closing valve HC3.

Next, the two-way piston 50 (actuator) that is used as a switching control mechanism will be described with reference to FIGS. 10 to 13.

Figure 10:
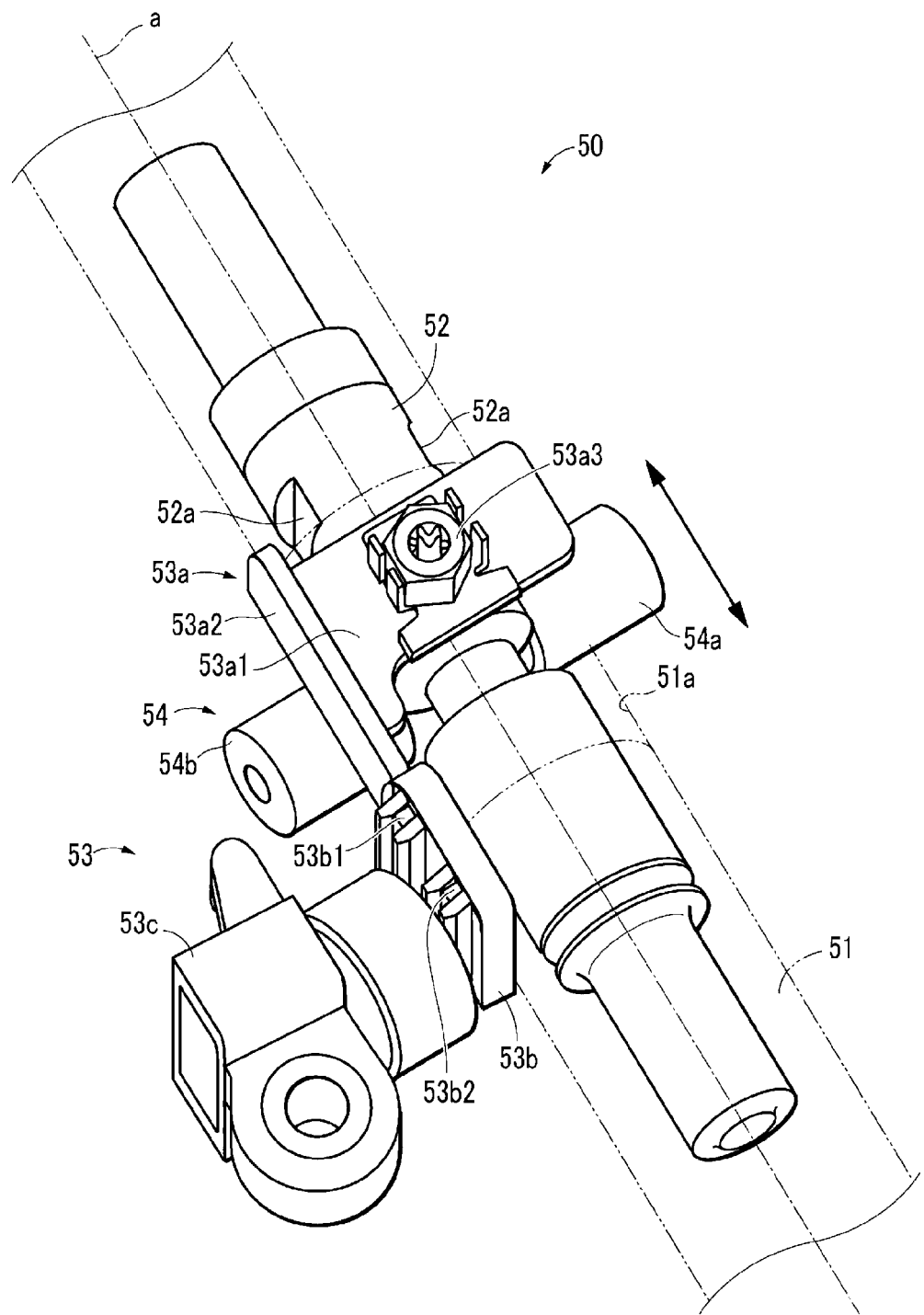
FIG. 10 is a perspective view illustrating shapes of a piston, a stay, a magnet, and a sensor of a two-way piston which is the switching control mechanism of FIGS. 9A and 9B.
Figure 11:
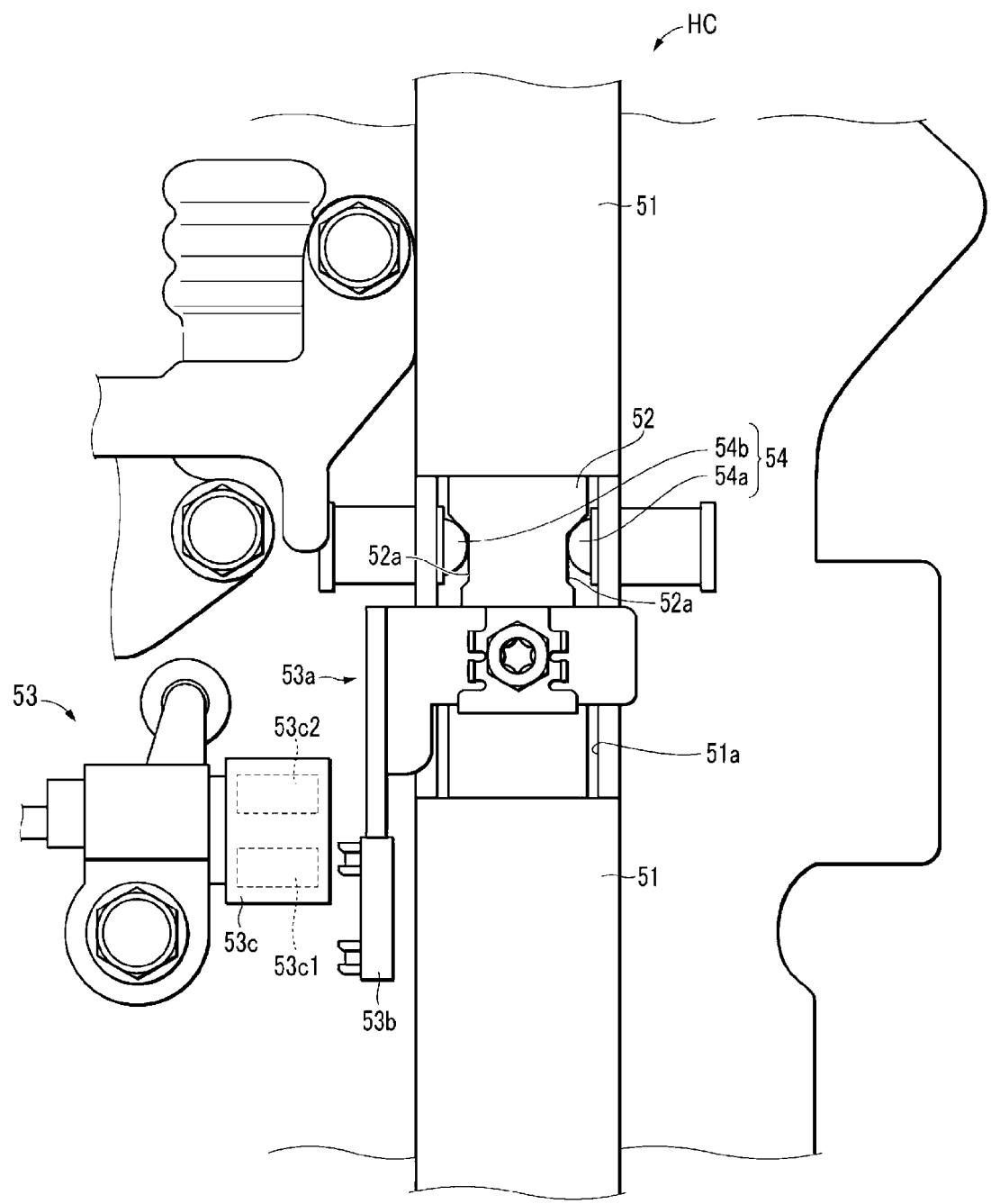
FIG. 11 is a plan view of the two-way piston of FIG. 10.

As illustrated in FIGS. 10 and 11, the two-way piston 50 includes a cylindrical cylinder 51, a piston 52 that moves in a direction of the axis a inside the cylinder 51 according to the supplied hydraulic pressure, a stroke sensor 53 that detects the position of the piston 52, and a detent mechanism 54 that fixes the position of the piston 52 until the hydraulic pressure exceeds a predetermined value.

The cylinder 51 is integrally formed with a case of the hydraulic pressure control circuit HC, and an opening 51a communicating the inside and the outside of the cylinder 51 is formed in a central portion of a circumferential surface thereof.

The piston 52 is connected to the protrusion portion TW20c of the two-way clutch F1 via a link structure (not illustrated). Therefore, according to a reciprocating motion of the piston 52 in the direction of the axis a, the protrusion portion TW20c also performs a reciprocating motion, and switching between the locked state and the reverse rotation prevention state of the two-way clutch F1 occurs.

The piston 52 is configured by a member having a substantially cylindrical shape. On a side surface of the piston 52, a pair of first concave portions 52a provided to face each other with the axis a interposed therebetween, and a pair of second concave portions (not illustrated) provided to face each other with the axis a interposed therebetween on the lower side (the side of a stay 53a described below) relative to the first concave portion 52a are formed.

A stroke sensor 53 includes a stay 53a attached to move integrally with the piston 52 and extending from a portion exposed from an opening 51a of the piston 52 to the outside of the cylinder 51, a member to be detected 53b attached to a portion located outside the cylinder 51 of the stay 53a, and a sensor 53c that detects a position of the member to be detected 53b (eventually, the position of the piston 52).

The stay 53a is a L-shaped member including a first plate-like portion 53a1 which is fixed to intersect the axis a in the portion exposed from the opening 51a of the piston 52, and a second plate-like portion 53a2 which extends downwardly from an end portion opposite to the piston 52 side of the first plate-like portion 53a1. The stay 53a is fixed to the piston 52 by fastening the first plate-like portion 53a1 to the piston 52 with a bolt 53a3.

The member to be detected 53b is fixed to a distal end portion of the stay 53a opposite to the first plate-like portion 53a1 side of the second plate-like portion 53a2 of the stay 53a. A first magnet 53b1 and a second magnet 53b2 are arranged on the side of the sensor 53c of the member to be detected 53b. The first magnet 53b1 is located on the first plate-like portion 53a1 side of the stay 53a in the direction of the axis a relative to the second magnet 53b2.

The sensor 53c detects a magnetic force (eventually, a position of the member to be detected 53b) of the first magnet 53b1 and the second magnet 53b2 of the member to be detected 53b. The control unit ECU (see FIG. 1) determines the position of the piston 52 (eventually, a state of the two-way clutch F1 controlled by the two-way piston 50) on the basis of a detection value transmitted from the sensor 53c, and controls the hydraulic pressure that is supplied to the two-way piston 50 on the basis of a result of the determination.

The detent mechanism 54 includes a pair of elastic members (a first elastic member 54a and a second elastic member 54b) that are arranged to face each other with a first plane P1 including the axis "a" interposed therebetween (see FIG. 13) and press the piston 52 to sandwich the piston 52 therebetween.

The first elastic member 54a and the second elastic member 54b are engaged with any one of the pair of first concave portion 52a and the pair of second concave portion formed on the side surface of the piston 52 when the piston 52 is located at any one of a position corresponding to the locked state of the two-way clutch F1 and a position corresponding to the reverse rotation prevention state to fix the position of the piston 52. Specifically, the detent mechanism 54 is engaged with the second concave portion in the state illustrated in FIG. 10, and is engaged with the first concave portion 52a in the state illustrated in FIG. 11.

This fixing is released when the hydraulic pressure applied to the piston 52 exceeds a predetermined value (specifically, the predetermined switching hydraulic pressure that is set on the basis of the pressure difference between the hydraulic pressure of the first clutch C1, the first brake B1, or the second brake B2 and the hydraulic pressure of the third clutch C3 and the load due to the first elastic member 54a and the second elastic member 54b constituting the detent mechanism 54.

The two-way piston 50 (actuator) configured in this way cooperates with the control unit ECU (see FIG. 1) to constitute a hydraulic pressure control circuit (fluid pressure control circuit).

In this hydraulic pressure control circuit, the control unit ECU determines the position of the piston 52 (eventually, the state of the two-way clutch F1 controlled by the two-way piston 50) on the basis of the detection value transmitted from the sensor 53c, and controls the hydraulic pressure supplied to the two-way piston 50 on the basis of a result of the determination.

The control of the hydraulic pressure is performed on the basis of the detection value transmitted from the first sensor unit 53c1 and the second sensor unit 53c2 of the sensor 53c. A detection value from a controlling sensor unit set by a manufacturer of the vehicle V among the first sensor unit 53c1 and the second sensor unit 53c2 is used as the detection value that is used for the control.

Here, a method of setting the controlling sensor unit among the first sensor unit 53c1 and the second sensor unit 53c2 (that is, a method of setting the two-way piston 50) will be described.

As illustrated in FIGS. 10 and 11, in the two-way piston 50, the piston 52 moves in a direction of the axis "a" inside the cylinder 51 according to the supplied hydraulic pressure between two positions defined by the first concave portion 52a and the second concave portion formed on a side surface of the piston 52.

In order to set the controlling sensor unit, the manufacturer firstly moves the piston 52 in the direction of the axis a inside the cylinder 51 experimentally and causes a processing terminal (for example, the control unit ECU) to acquire the detection value of the first sensor unit 53c1 and the detection value of the second sensor unit 53c2 for each position of the piston 52 a plurality of times (detection value acquisition step).

Then, the manufacturer causes the processing terminal to calculate a variation in the detection value of the first sensor unit 53c1 and a variation in the detection value of the second sensor unit 53c2 at each position, on the basis of the acquired detection values. Here, the "variation" of the detection value indicates a difference between a maximum value and a minimum value of the detection value.

Finally, the manufacturer sets the sensor unit with a small variation in the detection value in a range in which the piston 52 moves when the two-way piston 50 is actually used among the first sensor unit 53c1 and the second sensor unit 53c2 as a controlling sensor unit (controlling sensor unit-setting step).

Figure 12:
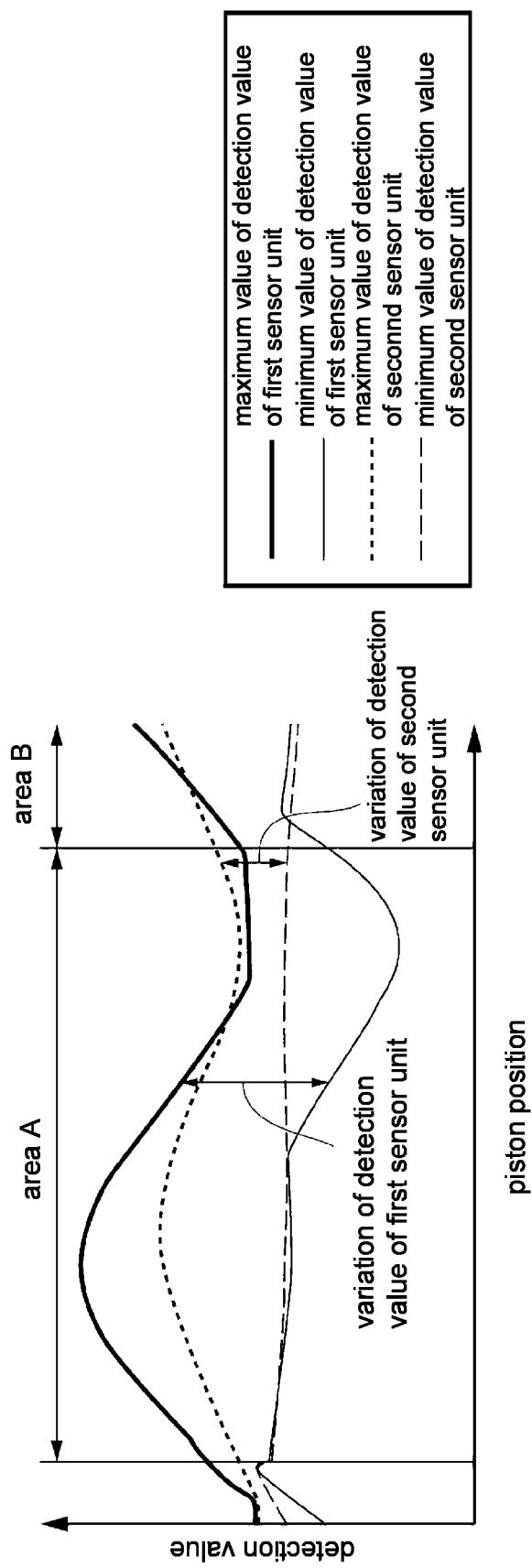
FIG. 12 is a graph illustrating a detection value of a sensor unit of the two-way piston in FIG. 10.

Specifically, for example, it is assumed that a graph as illustrated in FIG. 12 can be acquired for the detection value as a result of moving the piston 52 a plurality of times and performing the detection experimentally. In this graph, the maximum value of the detection value of the first sensor unit 53c1 is indicated by a thick solid line, and the minimum value thereof is indicated by a thin solid line. Further, the maximum value of the detection value of the second sensor unit 53c2 is indicated by a broken line with a small interval, and the minimum value thereof is indicated by a broken line with a large interval.

In this graph, in an area A, the second sensor unit 53c2 has a smaller variation than the first sensor unit 53c1, and in an area B, the first sensor unit 53c1 has a smaller variation than the second sensor unit 53c2.

In an embodiment, when such characteristics are obtained, only the sensor unit of which detection accuracy in the predetermined area is high (for example, the second sensor unit 53c2 of which the variation in the detection value is small) may be set as the controlling sensor unit, for example, in a case in which a degree of importance in control of the two-way piston 50 is higher by a predetermined range in a movement range of the piston 52 (for example, a case in which only a part of the area A has a high degree of control importance).

Further, for example, in a case in which the piston 52 reciprocates only within a range of the area A, only the second sensor unit 53c2 may be set as the controlling sensor unit.

Thus, in an embodiment, when there is only one sensor unit that is used as the controlling sensor unit, it is possible not to switch the sensor unit that acquires the detection value for each position of the piston 52 in the control of the two-way piston 50, and therefore, the control can be easily performed.

Further, for example, when the piston 52 reciprocates within a range extending over both the area A and the area B, both the first sensor unit 53c1 and the second sensor unit 53c2 may be set as the controlling sensor unit. Specifically, the second sensor unit 53c2 is set as the controlling sensor unit in the area A, and the first sensor unit 53c1 is set as the controlling sensor unit in the area B.

Thus, when the controlling sensor unit is switched for each position of the piston 52, it is possible to perform the detection using a range in which the detection accuracy of each sensor unit is high, and therefore, it is easy to further secure sufficient detection accuracy.

The controlling sensor unit set as described above is stored in a storage unit of the control unit ECU. The hydraulic pressure control unit (the fluid pressure control unit) of the control unit ECU controls the hydraulic pressure that is supplied to the two-way piston 50 on the basis of the detection value transmitted from the controlling sensor unit.

As described above, when the two-way piston 50 is set, the controlling sensor unit is set from among the first sensor unit 53c1 and the second sensor unit 53c2 for each position of the piston 52, and the control of the two-way piston 50 is performed by referring to the detection value from the controlling sensor unit. Further, the controlling sensor unit is set on the basis of the detection value detected when the piston 52 is actually moved.

That is, in this setting method, an appropriate sensor unit is set from among the first sensor unit 53c1 and the second sensor unit 53c2 according to the characteristics obtained when the piston 52 is actually moved (that is, the characteristics of individual sensor units). Accordingly, it possible to secure sufficient detection accuracy without strictly setting an attachment position of the sensor unit in a step of attaching the sensor unit.

Although the embodiments shown in the drawings have been described above, the embodiments of the invention are not limited to such embodiments.

For example, in the above embodiment, the actuator of the invention is adopted as the two-way piston 50 for switching between the locked state and the reverse rotation prevention state of the two-way clutch F1. However, the actuator of the embodiments of the invention is not an actuator that can be adopted only for such a two-way piston. For example, the actuator of the embodiments of the invention may be adopted as a parking piston that switches between a parking locked state and a parking released state of the parking lock mechanism.

Further, in the above embodiment, the sensor unit for control is selected from the two sensor units including the first sensor unit 53c1 and the second sensor unit 53c2. However, it is possible that the sensor unit for control of the embodiments of the invention is not selected from the two sensor units. For example, the sensor unit for control may be selected from three or more sensor units.

Further, in the above embodiment, as a reference for selecting the controlling sensor unit, reference is made to the variation in the detection value of each sensor unit. This is intended to suppress an influence of the variation in the detection value caused by, for example, a difference in machining accuracy of components of the sensor unit and to be able to accurately perform the detection.

However, the sensor unit for control of the embodiments of the invention may be selected on the basis of the detection value, and it is possible that the sensor unit for control is not selected on the basis of the variation in the detection value. For example, the sensor unit that transmits the greatest detection value for each position of the piston among the detection values acquired when the piston is experimentally moved may be selected as the sensor unit for control. In this case, the experimental movement for selecting the sensor unit for control may not be performed a plurality of times.

What is claimed is:

1. A method of setting an actuator including a stroke sensor, the stroke sensor including a member to be detected attached to move integrally with a piston that moves according to a fluid pressure supplied inside a cylinder, and a sensor that detects a position of the member to be detected, and controlling a position of the piston on the basis of a result of detection by the stroke sensor, the method comprising:
    a detection value acquisition step of moving the piston in an axial direction inside the cylinder and acquiring a detection value that is a result of detecting the position of the member to be detected from each of a plurality of sensor units of the sensor for each position of the piston; and
    a controlling sensor unit-setting step of setting a controlling sensor unit that is used for control of the actuator from among the plurality of sensor units on the basis of the detection value obtained for each of the plurality of sensor units.

2. The method of setting an actuator according to claim 1, wherein the controlling sensor unit-setting step includes setting only one sensor unit selected from the plurality of sensor units as the controlling sensor unit on the basis of the detection value obtained for each of the plurality of sensor units.

3. The method of setting an actuator according to claim 2, wherein the controlling sensor unit-setting step includes setting a sensor unit of which a variation in the detection value in a range in which the piston moves when the actuator is actually used is smallest among the plurality of sensor units, as the controlling sensor unit.

4. The method of setting an actuator according to claim 2, wherein the controlling sensor unit-setting step includes setting a sensor unit of which detection accuracy at a position or in a range of the piston having a high degree of importance in control of the actuator is highest among the plurality of sensor units, as the controlling sensor unit.

5. The method of setting an actuator according to claim 1, wherein the controlling sensor unit-setting step includes setting any one sensor unit selected from the plurality of sensor units as the controlling sensor unit for each position of the piston on the basis of the detection values obtained for each of the plurality of sensor units.

6. The method of setting an actuator according to claim 5, wherein the controlling sensor unit-setting step includes setting a sensor unit having the smallest variation in the detection value for each position of the piston among the plurality of sensor units, as the controlling sensor unit.

7. The method of setting an actuator according to claim 1, wherein the actuator is a two-way piston that switches between a reverse rotation prevention state and a locked state of a two-way clutch.

8. The method of setting an actuator according to claim 1, wherein the actuator is a parking piston that switches between a parking locked state and a parking released state of a parking lock mechanism.

9. A fluid pressure control circuit comprising a control unit and an actuator that is controlled by the control unit,
wherein the actuator comprises a cylinder, a piston that moves in an axial direction inside the cylinder according to supplied fluid pressure, and a stroke sensor that detects a position of the piston,
the stroke sensor includes a member to be detected attached to move integrally with the piston, and a sensor that detects a position of the member to be detected,
the sensor includes a plurality of sensor units that transmit a result of detecting the position of the member to be detected as a detection value to the control unit,
the control unit includes a storage unit that stores a controlling sensor unit selected from among the plurality of sensor units, and a fluid pressure control unit that controls a fluid pressure to be supplied to the actuator by referring to the detection value from the controlling sensor unit, and
the controlling sensor unit is selected on the basis of the detection value detected when the piston is actually moved.

10. The method of setting an actuator according to claim 2, wherein the actuator is a two-way piston that switches between a reverse rotation prevention state and a locked state of a two-way clutch.

11. The method of setting an actuator according to claim 3, wherein the actuator is a two-way piston that switches between a reverse rotation prevention state and a locked state of a two-way clutch.

12. The method of setting an actuator according to claim 4, wherein the actuator is a two-way piston that switches between a reverse rotation prevention state and a locked state of a two-way clutch.

13. The method of setting an actuator according to claim 5, wherein the actuator is a two-way piston that switches between a reverse rotation prevention state and a locked state of a two-way clutch.

14. The method of setting an actuator according to claim 6, wherein the actuator is a two-way piston that switches between a reverse rotation prevention state and a locked state of a two-way clutch.

15. The method of setting an actuator according to claim 2, wherein the actuator is a parking piston that switches between a parking locked state and a parking released state of a parking lock mechanism.

16. The method of setting an actuator according to claim 3, wherein the actuator is a parking piston that switches between a parking locked state and a parking released state of a parking lock mechanism.

17. The method of setting an actuator according to claim 4, wherein the actuator is a parking piston that switches between a parking locked state and a parking released state of a parking lock mechanism.

18. The method of setting an actuator according to claim 5, wherein the actuator is a parking piston that switches between a parking locked state and a parking released state of a parking lock mechanism.

19. The method of setting an actuator according to claim 6, wherein the actuator is a parking piston that switches between a parking locked state and a parking released state of a parking lock mechanism.

* * * * *